US011706313B2

(12) United States Patent
Richards

(10) Patent No.: US 11,706,313 B2
(45) Date of Patent: Jul. 18, 2023

(54) SYSTEMS, METHODS, AND DEVICES FOR USER INTERFACE CUSTOMIZATION BASED ON CONTENT DATA NETWORK PRIMING

(71) Applicant: Salesforce, Inc., San Francisco, CA (US)

(72) Inventor: David Richards, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/726,738

(22) Filed: Dec. 24, 2019

(65) Prior Publication Data
US 2021/0191740 A1 Jun. 24, 2021

(51) Int. Cl.
*H04L 67/568* (2022.01)
*G06F 16/957* (2019.01)
*H04L 67/1021* (2022.01)
*H04L 67/56* (2022.01)
*H04L 67/50* (2022.01)
*H04L 67/5681* (2022.01)

(52) U.S. Cl.
CPC ........ *H04L 67/568* (2022.05); *G06F 16/9574* (2019.01); *H04L 67/1021* (2013.01); *H04L 67/535* (2022.05); *H04L 67/56* (2022.05); *H04L 67/5681* (2022.05)

(58) Field of Classification Search
None
See application file for complete search history.

(56) References Cited

U.S. PATENT DOCUMENTS

| 6,874,017 | B1 * | 3/2005 | Inoue | H04L 12/189 709/217 |
| 8,448,057 | B1 * | 5/2013 | Sugnet | G06Q 30/0273 715/204 |
| 2001/0037407 | A1 * | 11/2001 | Dragulev | G06F 16/9535 709/250 |
| 2010/0211636 | A1 * | 8/2010 | Starkenburg | H04N 21/43615 709/203 |
| 2012/0197984 | A1 * | 8/2012 | Rao | H04W 88/02 709/203 |
| 2014/0074866 | A1 * | 3/2014 | Shah | G06F 16/78 707/749 |

(Continued)

*Primary Examiner* — Lance Leonard Barry
(74) *Attorney, Agent, or Firm* — Polygon IP, LLP

(57) ABSTRACT

A computing platform is implemented using a server system. The computing platform is configurable to cause identifying a data event associated with a user based on an interaction between the user and a user interface, and generating a segment data object based on the data event, a unique user identifier, and a segment database, the segment data object characterizing a membership of the user within an audience segment. The computing platform is also configurable to cause identifying a content data network server based on a geographical location of the user, the content data network server being a closest available content data network server to the user, and the content data network server being capable of serving, to the user, one or more data objects associated with metadata customized based on one or more segment data objects, and updating a local storage location of the content data network server.

20 Claims, 9 Drawing Sheets

(56) References Cited

U.S. PATENT DOCUMENTS

| | | | |
|---|---|---|---|
| 2014/0282683 A1* | 9/2014 | Chee | H04N 21/42684 |
| | | | 725/30 |
| 2014/0324604 A1* | 10/2014 | Munoz Torres | G06Q 30/0276 |
| | | | 705/14.72 |
| 2015/0227977 A1* | 8/2015 | Shottan | H04L 67/306 |
| | | | 705/14.64 |
| 2016/0328132 A1* | 11/2016 | Davidchuk | G06F 3/04847 |
| 2017/0147182 A1* | 5/2017 | Martinazzi | H04L 67/04 |
| 2019/0205950 A1* | 7/2019 | Balasubramanian | G06N 20/00 |
| 2019/0324606 A1* | 10/2019 | Kveton | G06N 7/00 |

\* cited by examiner

SYSTEMS, METHODS, AND DEVICES FOR USER INTERFACE CUSTOMIZATION BASED ON CONTENT DATA NETWORK PRIMING

FIELD OF TECHNOLOGY

This patent document relates generally to content data networks and more specifically to customization of user interfaces using such content data networks.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One type of service provided via the cloud is an on-demand computing platform. In an on-demand computing platform, the cloud computing service provider manages the underlying infrastructure, which may be a distributed database infrastructure, while users may store data in the cloud rather than on their premises.

BRIEF DESCRIPTION OF THE DRAWINGS

The included drawings are for illustrative purposes and serve only to provide examples of possible structures and operations for the disclosed inventive systems, apparatus, methods and computer program products for user interface customization using content data networks. These drawings in no way limit any changes in form and detail that may be made by one skilled in the art without departing from the spirit and scope of the disclosed implementations.

DETAILED DESCRIPTION

Figure 1:
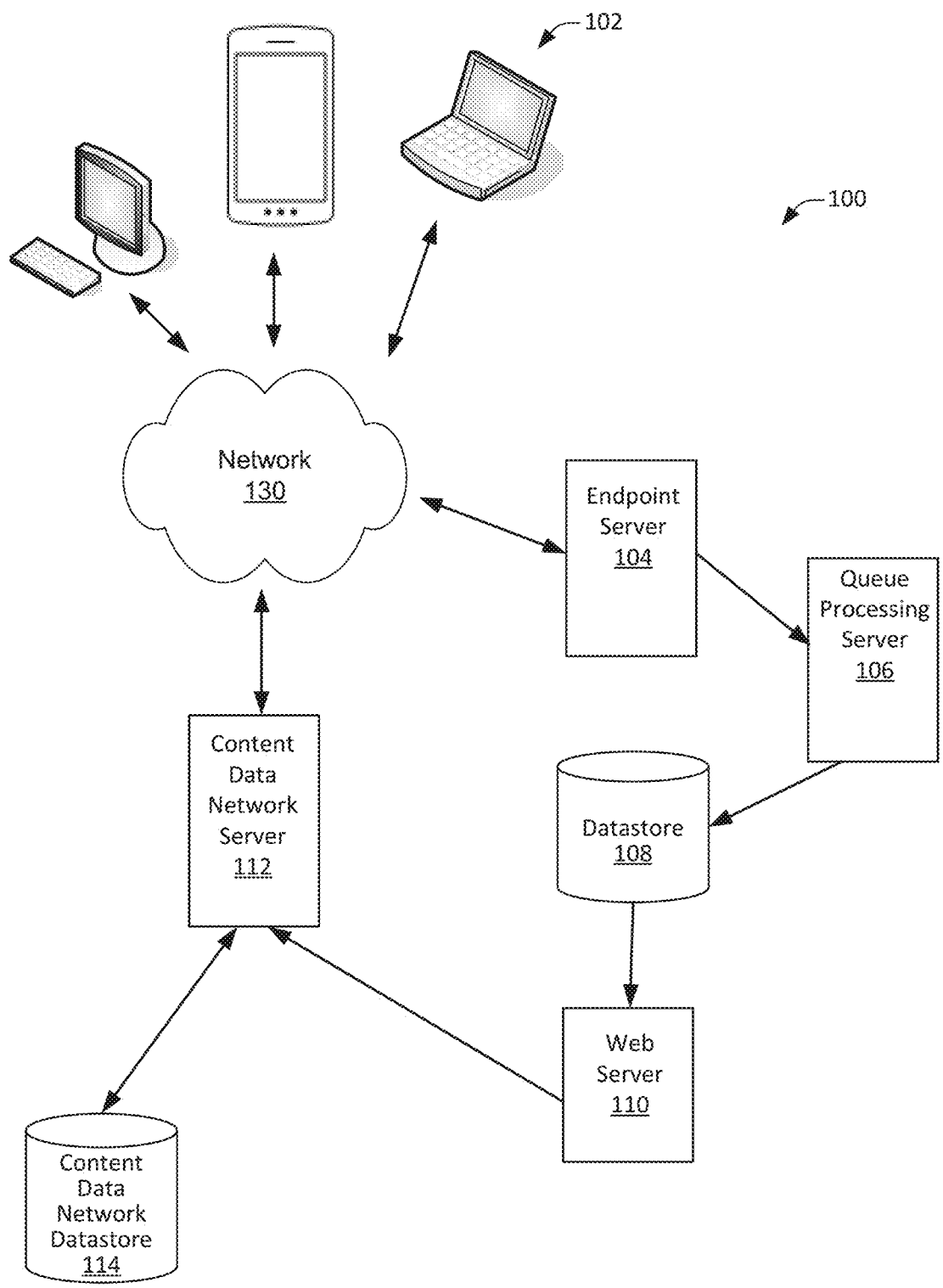
FIG. 1 illustrates an example of a system for user interface customization using a content data network, configured in accordance with some embodiments.

On-demand computing platforms may be used to host applications that can be used by numerous users in a distributed manner across various geographical locations. Accordingly, in such computing platforms, utilization of the application is provided to the users by one or more servers accessible over the Internet rather than installing software locally on in-house computer systems. In this way, the application is provided to the user via a web-based interface, and execution of the application as well as storage of associated files and data is implemented using a distributed or cloud-based computing infrastructure.

Users of on-demand computing platforms, and applications supported by such computing platforms, may be distributed across many different geographical regions. Moreover, such applications may be software as a service (SaaS) applications in which an on-demand computing platform hosts the application, and users may access the applications via a communications network, such as the internet. Accordingly, a user and a user's data may be distributed across a large geographical distance, and a user may experience communications latencies as a result of such distances. For example, a user may be located in one country, and may be provided with data objects from a data center located in another country. Furthermore, a presentation of a user interface may be customized for the user based on content data objects specific to that user. However, latencies associated with providing those content data objects may result in an overall delay in the generating and providing of the customized user interface. Accordingly, conventional techniques remain limited in their ability to reduce such latencies.

Various embodiments disclosed herein enable the customization of user interfaces provided to users with reduced latencies. Local components of a content data network proximate to a user may be pre-primed to include custom content. Accordingly, when the user is presented with a user interface that is customized based on such content, the relevant content data objects have already been stored at a local storage location, and may be provided to the user with minimal latency. Furthermore, the local storage location may be pre-primed with additional information as well. For example, the local storage location may be pre-primed to include additional metadata about a user that may be used to identify additional content data objects. For example, such metadata may be segment information that identifies audience segments that a user belongs to. Accordingly, such metadata may be included in a component of the customized user interface, such as a header, and maybe used to customize content included in the user interface when it is loaded by the user.

In one example, a user may be located remotely in a first geographical region. More specifically, the user may be located in Tokyo, Japan. In this example, the user may access, via a user interface, an application provided by an on-demand computing platform, such as an SaaS application provided by Salesforce.com®. Accordingly, a data center, which may be part of an on-demand database service environment, stores user data in a second geographical region which may, for example, be the United States of America. Due to the distance between the two regions, there may be a relatively large latency between the user and the data center.

As will be discussed in greater detail below, one or more system components of the computing platform may be used to identify previous data events associated with the user, and identify audience segment information associated with the user. More specifically, a user identifier may be used to identify previous data events, such as impressions and interactions with data objects maintained by the data center. The audience segment information may be compared against user account information specific to the application for which a user interface is being customized, and a segment data object may be generated and sent to a component of a content data network that is local to the user. For example, the segment data object may be sent to a local storage location of a content data network located in Tokyo, Japan. The segment data object may be used to identify and retrieve content data objects to pre-prime that local storage location to store such content data objects. In this way, the components of the content data network proximate to the user may be primed with content data objects determined, at least in part, on audience membership information of the user. Accordingly, when subsequent requests are made for such content, as may be the case when a custom user interface is generated, the local storage location may be used, and the overall latency of providing the user interface is reduced.

FIG. 1 illustrates an example of a system for user interface customization using a content data network, configured in accordance with some embodiments. Accordingly, a system, such as system 100, may include various components utilized to provide content to a user when a user interface is loaded. As noted above, such content may be customized for the particular user, and such customization may be facilitated by the use of a content data network as well as various user data. As will be discussed in greater detail below, system 100 may be configured such that the content data network is primed in advance to include content that may be used in subsequent user interface customizations. In this way, local components of a content data network may be pre-primed to maintain a low-latency data store that includes the content used in the subsequent user interface customizations. Using the content data network in this manner reduces latency that may occur when geographically distant resources are accessed, such as a distant data center, and also reduced the need for a larger scale implementation of a local data center.

In various embodiments, a content data network is a network that includes multiple content data network servers that are configured to be implemented inside data storage facilities, such as data centers, and may be implemented with web server capabilities. Accordingly, a data center may include numerous computing resources, such as storage devices and nodes, as well as a communication fabric implemented on top of the storage devices which may include various levels of switches and network devices. The content data network server may be communicatively coupled to this communication fabric to enable communication with the storage devices as well as a top-level network resource that may be coupled to a network such as the internet.

Furthermore, content data network servers may be distributed across numerous data centers around the world. Accordingly, the content data network may include numerous content data network servers each implemented in different data centers distributed across numerous different geographical regions. In this way, the content data network servers are configured to implement a dedicated network of servers that are geographically distributed and dynamically provide access to servers closer to more end devices, such as smartphones, laptops, and desktops. As will be discussed in greater detail below, the providing of content in this manner may be configured and implemented based on aspects of a computing platform, such as user account data. Furthermore, latency associated with the content hosted by the content data network is reduced, and content is provided faster because requests for content do not have to travel far. In some embodiments, content data network servers are configured to have low hardware latencies as well. For example, they may be configured to have large random access memory (RAM) capacities as well as low-latency storage devices, such as solid-state hard drives.

As shown in FIG. 1, system 100 includes a client machine, such as client machine 102. In various embodiments, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to a communications network, such as the internet. In various embodiments, client machine 102 is configured to execute one or more applications, such as a user interface. Accordingly, a user may request and view various different user interfaces via client machine 102. In various embodiments, a user interface may be used to present a web page to the user. Accordingly, the user interface may utilize a web browser executed on client machine 102.

System 100 also includes endpoint server 104 which is configured to receive various information relating to interactions between client machine 102 and various different user interfaces associated with webpages. Accordingly, endpoint server 104 may be in communication with client machine 102, or with one or more web servers used to provide user interfaces to client machine 102. Moreover, endpoint server 104 may receive information identifying one or more data events associated with the interactions between webpages and the user. For example, data events may identify user impressions in which a user has been presented with and viewed a particular content item in a webpage. In various embodiments, endpoint server 104 may receive such data events identifying impressions from a web server or from client machine 102.

System 100 further includes queue processing server 106 which is configured to implement a message queue that may used to manage communications with other system components, such as datastore 108. In various embodiments, datastore 108 is configured to store various system data associated with numerous users. Accordingly, datastore 108 is configured to store various user data, such as a unique user identifier, as well as audience segment data that may identify which audience segments a user belongs to. For example, an audience segment may be a segment or category defined by one or more characteristics of a user, such as age, gender, interests, preferences, and/or income level. The audience segment may also be defined based on user actions and activity, such as if a user viewed a page, if they read an article, saw an advertisement, signed up for a mailing list or promotion, or didn't complete a checkout.

System 100 also includes web server 110 which is communicatively coupled to datastore 108 and is configured to facilitate communication between datastore 108 and components of a content data network that are discussed in greater detail below. In this way, communication may be facilitated between datastore 108, that may be implemented in a data center, and components of a content data network that are implemented in a location more proximate to client machine 102 and its associated user.

System 100 additionally includes content data network server 112 which is configured to communicate with web server 110, and provide an access point to a content data network. In various embodiments, content data network server 112 is a point of presence (POP) that provides web server 110 with a point of access to the content data network. In various embodiments, the content data network also include a storage location, such as content data network datastore 114, which is configured to store content items that may be used for presentation in a user interface. As will be discussed in greater detail below, the presentation of the user interface may be customized and personalized for a user based on the user's previous activity. It will be appreciated that any of the servers and datastores described above may be implemented using components of the systems described below in greater detail with reference to FIGS. 7, 8A, 8B, and 9.

Figure 2:
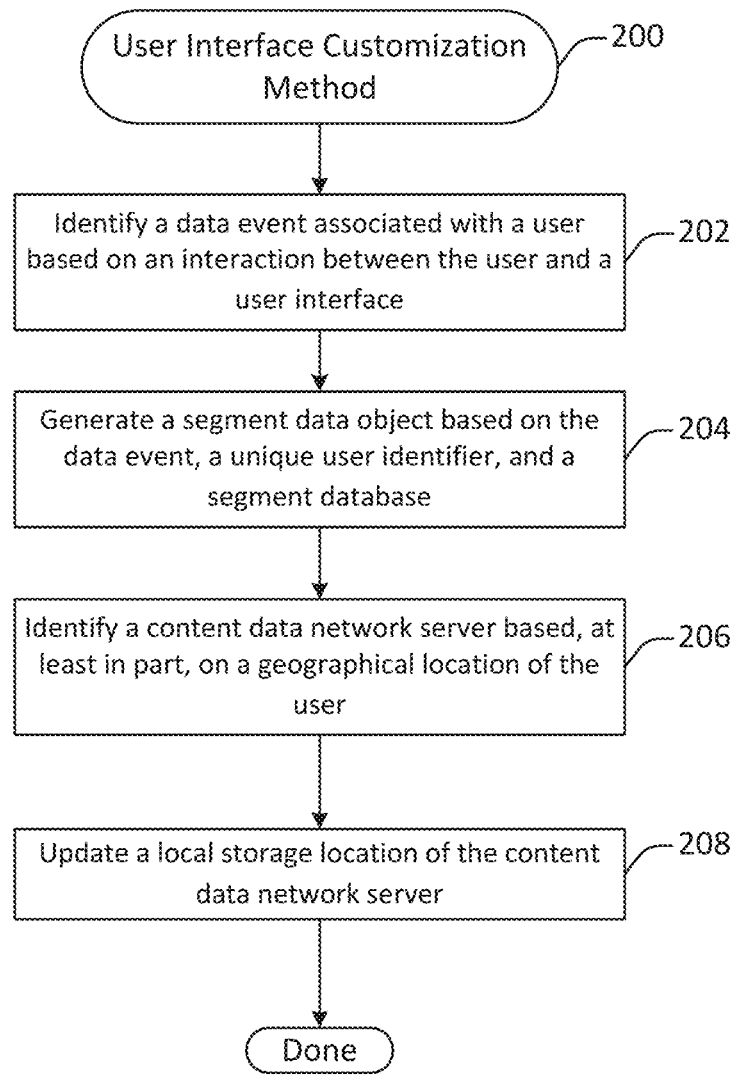
FIG. 2 illustrates a flow chart of an example of a method for user interface customization using a content data network, implemented in accordance with some embodiments.

FIG. 2 illustrates a flow chart of an example of a method for user interface customization using a content data network, implemented in accordance with some embodiments. As discussed above, a content data network is primed in advance to include content that may be used in subsequent user interface customizations. In this way, local components of a content data network may be pre-primed to maintain a low-latency data store that includes the content used in the subsequent user interface customizations. Accordingly, a method, such as method 200 discussed below, may be implemented to enable such user interface customization.

Method 200 may commence with operation 202 during which a data event associated with a user may be identified based on an interaction between the user and a user interface. In various embodiments, the first data event includes a unique user identifier. For example, the data event may be an impression or conversion associated with the user in which the user clicks on or interacts with a user interface element presented in a user interface, such as a link or advertisement. The data event may be stored in a datastore, and may include various information such as a unique user identifier and a cookie identifier.

Method 200 may proceed to operation 204 during which a segment data object may be generated based on the data event, the unique user identifier, and a segment database. In various embodiments, the segment data object characterizes a membership of the user within an audience segment. Accordingly, during operation 204, a data object may be generated that identifies what audience segments and data categories a user belongs to.

Method 200 may proceed to operation 206 during which a content data network server may be identified based on a geographical location of the user. In various embodiments, the content data network server is a closest available content data network server to the user, and the content data network server is capable of serving, to the user, web pages having metadata, such as headers, customized based on one or more segment data objects. In some embodiments, the content data network server is identified based, at least in part, on a geographical identifier, such as an internet protocol (IP) address of the user. Accordingly, the geographical region of the user may be inferred based on the IP address, a content data network server may be identified based on the inferred geographical region, and a server identifier associated with the content data network server may be retrieved and stored.

Method 200 may proceed to operation 208 during which a local storage location of the content data network server may be updated. In various embodiments, the updating includes storing the segment data object in the local storage location. Accordingly, the content data network server may be provided with the segment data object, as well as information associated with the data event, such as the identifiers discussed above. In various embodiments, the content data network server may identify one or more content data objects based on the received segment data object, and may update a local storage location, such as a content data network datastore, to store the content data objects. In this way, the content data network datastore may be pre-primed with the relevant content data objects before a subsequent web page request occurs.

Figure 3:
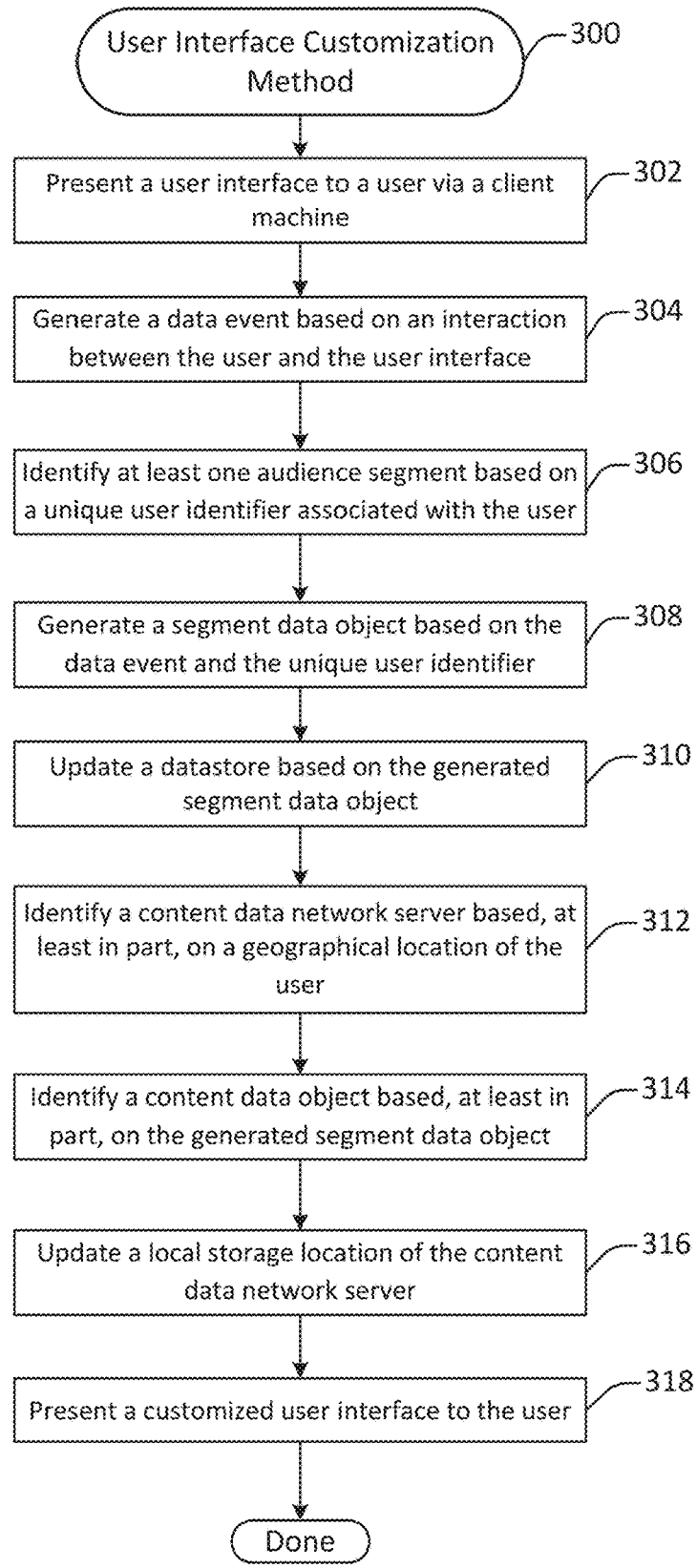
FIG. 3 illustrates a flow chart of another example of a method for user interface customization using a content data network, implemented in accordance with some embodiments.

FIG. 3 illustrates a flow chart of another example of a method for user interface customization using a content data network, implemented in accordance with some embodiments. As will be discussed in greater detail below, a method, such as method 300, may be implemented to update a local storage location to store content that may be used to personalize and customize a user interface presented to a user. The local storage location may be pre-primed in this way to enable the rapid customization and generation of the user interface with reduced latency.

Method 300 may commence with operation 302 during which a user interface may be presented to a user. As discussed above, a user interface may be used to display various user interface objects that may be included in, for example, a web page. In some embodiments, the web page is presented to the user responsive to an input provided by the user, such as entering a web address, or by some other system event or automated event that caused the web page to be provided to the user. Accordingly, a user may be presented with various components of a web page at a computing device, such as a client machine. As discussed above, the client machine may have various input devices through which the user may provide an input to the user interface.

Method 300 may proceed to operation 304 during which a data event may be generated. In various embodiments, the data event is a data object that identifies an interaction between the user and a user interface element. If the user selects or clicks on a particular user interface object or element, a data event may be generated that identifies the user as well as the data object that has been interacted with. In one example, if a user clicks on an image that includes an advertisement, a data event may be generated that includes a unique user identifier as well as one or more identifiers associated with the image that has been clicked on. Such identifiers may include a cookie identifier, an advertisement identifier, and/or an advertiser identifier.

Method 300 may proceed to operation 306 during which an audience segment may be identified. As similarly discussed above, an audience segment may refer to one or more categories used to define a group of users. Accordingly, an audience segment may be defined based on one or more data categories that identify dimensions of user data. In this way, combinations of data categories applied to dimensions of user data may be used to define an audience segment. In various embodiments, during operation 306, an audience segment may be identified based, at least in part, on the user identifier included in the data event. Accordingly, a datastore may maintain user data that includes user identifiers and associated audience segments that the user belongs to. The user identifier retrieved from the data event may be used to query the datastore, and identify one or more audience segments to which the user belongs. Furthermore, it may be determined if the user is associated with one or more applications implemented on an on-demand computing platform. For example, the user may have an account with an application, such as a software as a service (SaaS) application, and the user identifier may be used to determine if the user has an account with any applications provided by the systems disclosed herein.

Method 300 may proceed to operation 308 during which a segment data object may be generated. Accordingly, if it is determined that the user belongs to one or more audience segments, a segment data object may be generated that includes the user identifier as well as audience segment identifiers that identify which audience segments the user belongs to. In this way, the segment data object may define all audience memberships of its associated user. In some embodiments, if no audience segment exists, one may be generated based on available user characteristics, such as dimensions of the available user data.

Method 300 may proceed to operation 310 during which a datastore may be updated. In various embodiments, the user data included in the datastore may be updated to include the data event generated during operation 304. Accordingly, the data event and any associated metadata may be received and stored in a data table of the datastore with the rest of the user data for that particular user. In various embodiments, the datastore may be a key-value database that is configured to provide a low latency. Accordingly, data may be stored using entries using a form such as: unique_id=segmentMembership. Moreover, data may be retrieved using commands such as: get('123abc'). Furthermore, updates and modifications may be implemented using commands such as: save('123abc', ['1', '5', '9']).

Method 300 may proceed to operation 312 during which a content data network server may be identified. As discussed above, a content data network server may be configured to provide access to a content data network, as well as one or more content data network datastores. During operation 312, a content data network server may be identified based on metadata associated with the user, as well as one or more properties or characteristics of available content data network servers. For example, the metadata associated with the user, which may have been received as part of the data associated with the data event, may include an IP address of the user. The IP address may be used to identify a geographical location of the user, and a closest content data network server may be identified based on that geographical location. Accordingly, available content data network servers may be identified and ranked based on their physical distance from the identified geographical location of the user.

In some embodiments, other parameters may be used as well, such as a latency associated with the content data network servers. As discussed above, the content data network is configured to provide the most points of presence (POPs) distributed across the globe at the lowest latency from those locations. Accordingly, content data network servers may be configured to periodically ping numerous other geographical locations to estimate an average latency associated with numerous other geographical regions, and maintain such data in a distributed and widely available manner across the content data network such that the stored latency data may be used to identify a content data network server having lowest latency.

Method 300 may proceed to operation 314 during which a content data object may be identified. As discussed above, a content data object may be a data object that is included in a user interface presented to a user. For example, a content data object may be a customized user interface element, a custom layout, and/or an advertisement data object. Accordingly, during operation 314 one or more content data objects may be identified based, at least in part, on the segment data object. In one example, content data objects are identified based the data dimensions specified by the segment data object.

Method 300 may proceed to operation 316 during which a local storage location may be updated. Accordingly, the segment data object may be sent to the identified content data server, and a local storage location, such as a content data network datastore, may be updated to store the new segment data object. In various embodiments, the local storage location is a cache of the content data network datastore. In this way, a local storage location of the content data network may be updated with the user's audience segment information, and may also be used for customization of content provided to the user based on such audience segment information. In various embodiments, during operation 316, the local storage location may also be updated to include the identified content data objects. In this way, the local storage location may be pre-primed to store the identified content data objects so that they may be accessed and served with reduced latency when requested by the user.

Method 300 may proceed to operation 318 during which an additional user interface may be presented to a user. In various embodiments, a subsequent request for a user interface may be made by the user, and an additional or second user interface may be generated and provided to the user based, at least in part, on the identified content data object. In one example, the additional user interface may be an additional web page that is customized to include the identified content data object. More specifically, the additional web page may be customized to include an advertisement data object targeted to the user. In some embodiments, metadata associated with the user interface may be customized. For example, a header of a web page may be customized based on the segment data object to include the user's audience membership information, and to determine what content is loaded when the web page is loaded. In some embodiments, the additional web page may also include one or more other user interface elements that are personalized to the user. In some embodiments, the website may be customized based on maintained session data. For example, a user may pick up where they left off in their last session. If the user was watching a video but didn't finish, a user interface element could be generated to provide an option to continue to the page where they left off.

Figure 4:
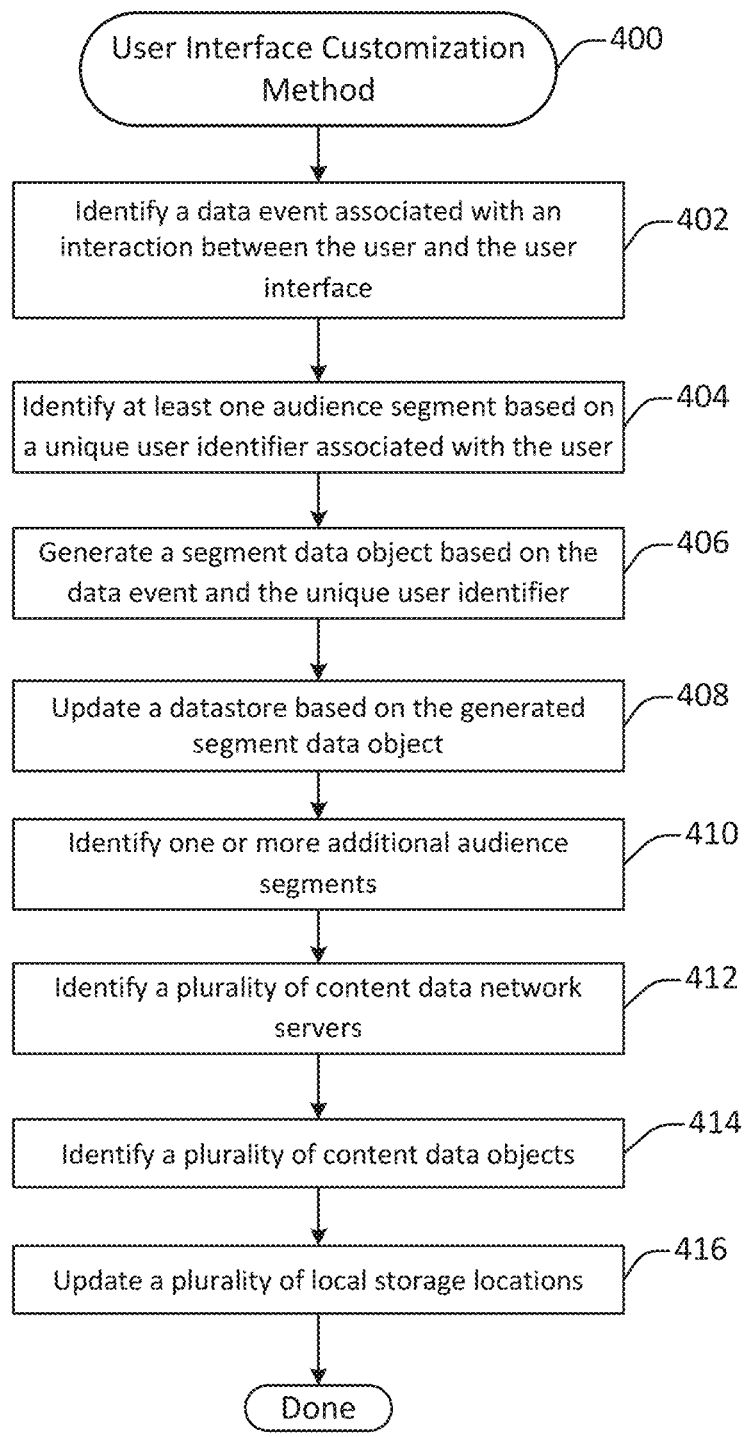
FIG. 4 illustrates a flow chart of yet another example of a method for user interface customization using a content data network, implemented in accordance with some embodiments.

FIG. 4 illustrates a flow chart of yet another example of a method for user interface customization using a content data network, implemented in accordance with some embodiments. As discussed above, a local storage location may be updated to store content that may be used to personalize and customize a user interface presented to a user. As will be discussed in greater detail below, a method, such as method 400, may be implemented to update multiple different storage locations associated with different, thus providing enhanced customization for multiple different user or entities simultaneously.

Method 400 may commence with operation 402 during which a data event may be identified. As similarly discussed above, a data event is a data object that identifies an interaction between the user and a user interface element. In various embodiments, the data event may be generated responsive to the interaction between the user and the user interface element, or may be identified based on one or more other conditions, such as an automated process implemented periodically.

Method 400 may proceed to operation 404 during which an audience segment may be identified. As similarly discussed above, an audience segment may refer to one or more categories used to define a group of users. Accordingly, an audience segment may be defined based on one or more data categories that identify dimensions of user data. In various embodiments, during operation 404, an audience segment may be identified based, at least in part, on the user identifier included in the data event. Furthermore, it may be determined if the user is associated with one or more applications implemented on a computing platform.

Method 400 may proceed to operation 406 during which a segment data object may be generated. As also discussed above, if it is determined that the user belongs to one or more audience segments, a segment data object may be generated that includes the user identifier as well as audience segment identifiers that identify which audience segments the user belongs to. In some embodiments, if no audience segment exists, one may be generated based on available user characteristics, such as dimensions of the available user data.

Method 400 may proceed to operation 408 during which a datastore may be updated. In various embodiments, the user data included in the datastore may be updated to include the data event identified or generated during operation 402. Accordingly, the data event and any associated metadata may be received and stored in a data table of the datastore with the rest of the user data for that particular user.

Method 400 may proceed to operation 410 during which additional audience segments may be identified. In various embodiments, the additional audience segments may be similar or related audience segments that share one or more properties with the audience segment identified during operation 404. In various embodiments, such additional audience segments may be identified using one or more machine learning techniques. In various embodiments, additional audience segments may be identified based on audience segments assigned to users having similar user activities as the user associated with the data event underlying operation 402. For example, such activities may include buying a same or similar product, or being identified as having one or more interests, such as an interest in pizza and watching football. In such an example, all the users that like pizza and watch football may be identified and returned, and their assigned audience segments, as may be indicated by the datastore, may be deduplicated and returned as additional audience segments.

In various embodiments, sub-combinations of categories may also be used. For example, result objects may be returned that identify users that just like pizza and users that just like watching football. In this way, multiple different audience segments may be identified, and additional segment data objects may be generated if appropriate. As discussed above, additional users may be identified as well. More specifically, additional users that are also associated with such audience segments may also be identified. For example, the identified additional users may have characteristics and data categories matching the identified audience segment and additional audience segments. In this way, multiple users may be identified based on a single identified data event.

Method 400 may proceed to operation 412 during which a plurality of content data network servers is identified. As discussed above, a content data network server may be identified based on metadata associated with a user, as well as one or more properties or characteristics of available content data network servers. For example, the metadata may include an IP address of the user, and the IP address may be used to identify a geographical location of the user. Moreover, a closest content data network server may be identified based on that geographical location. During operation 412, a closest content data network server may be identified for each of the users identified during operation 410. In this way, multiple servers of a content data network may be identified to enable pre-priming of the content data network for multiple users simultaneously.

Method 400 may proceed to operation 414 during which a plurality of content data objects is identified. As discussed above, a content data object may be a data object that is included in a user interface presented to a user. During operation 414 content data objects may be identified based, at least in part, on the segment data objects. Accordingly, content data objects may be identified for each of the users, thus enabling the identification of personalized content for multiple users simultaneously.

Method 400 may proceed to operation 416 during which a plurality of local storage locations is updated. Accordingly, the segment data objects may be sent to their respective content data network servers for each user, and local storage locations, such as content data network datastores, may be updated for each user. In this way, multiple different local storage locations of the content data network may be updated with the users' audience segment information. In various embodiments, during operation 416, the local storage locations may also be updated to include the identified content data objects. Accordingly, the local storage locations may be pre-primed to store the identified content data objects so that they may be accessed and served with reduced latency when requested by each of the users.

Figure 5:
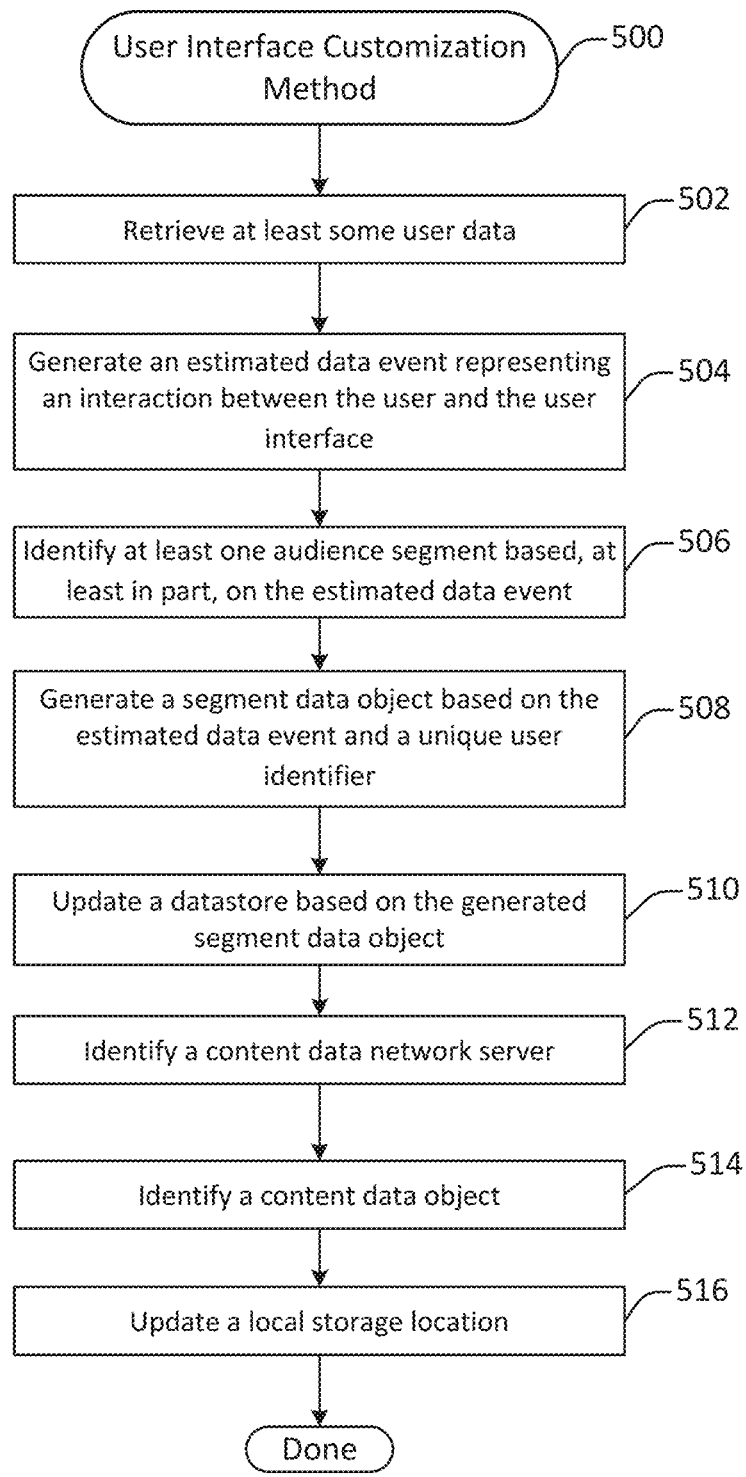
FIG. 5 illustrates a flow chart of an additional example of a method for user interface customization using a content data network, implemented in accordance with some embodiments.

FIG. 5 illustrates a flow chart of an additional example of a method for user interface customization using a content data network, implemented in accordance with some embodiments. As discussed above, a local storage location may be updated to store content that may be used to personalize and customize a user interface presented to a user. As will be discussed in greater detail below, a method, such as method 500, may be implemented to estimate data events for particular users, thus enabling estimates of user activity to be used to pre-prime storage locations of a content data network in anticipation of potential user activity.

Method 500 may commence with operation 502 during which user data is retrieved. As discussed above, a datastore operated and maintained by an on-demand computing platform provider may be configured to store various user data associated with numerous different users of a computing platform and applications implemented using the computing platform. In some embodiments, one or more users may be identified during operation 502, and user data for each user may be retrieved. The users may be identified based on an association with one or more applications implemented on a computing platform. For example, the users may be identified based on user accounts created with a particular application.

Method 500 may proceed to operation 504 during which an estimated data event is generated. In various embodiments, an estimated data event may be estimation of a data event that would occur if a user were presented with a content data object. The estimation may be based on the user's previous activity as well as the activity of similar users. In various embodiments, an estimation made based on the user's previous activity may be based on existing data events having associated content data objects. More specifically, those existing data events may be used to generate estimations of impressions and data events for that user for additional content data objects that share similar characteristics to those associated with the existing data events. In this way, estimations of data events may be generated for various different content data objects based on existing data events. Moreover, an estimation made based on the activity of similar users may be made based on dimensions of the users, and similarities between the dimensions of the users More specifically, users having similar dimensions or characteristics may be used to infer activity about each other.

Method 500 may proceed to operation 506 during which an audience segment may be identified. As similarly discussed above, an audience segment may refer to one or more categories used to define a group of users. Accordingly, an audience segment may be defined based on one or more data categories that identify dimensions of user data. In various embodiments, during operation 506, an audience segment may be identified based, at least in part, on a user identifier underlying the estimated data event. Furthermore, it may be determined if the user is associated with one or more applications implemented on a computing platform.

Method 500 may proceed to operation 508 during which a segment data object may be generated. As also discussed above, if it is determined that the user belongs to one or more audience segments, a segment data object may be generated that includes the user identifier as well as audience segment identifiers that identify which audience segments the user belongs to. In some embodiments, if no audience segment exists, one may be generated based on available user characteristics, such as dimensions of the available user data.

Method 500 may proceed to operation 510 during which a datastore may be updated. In various embodiments, the user data included in the datastore may be updated to include the estimated data event identified or generated during operation 504. Accordingly, the estimated data event and any associated metadata may be received and stored in a data table of the datastore with the rest of the user data for that particular user.

Method 500 may proceed to operation 512 during which a content data network server may be identified. As discussed above, a content data network server may be identified based on metadata associated with a user, as well as one or more properties or characteristics of available content data network servers. For example, the metadata may include an IP address of the user, and the IP address may be used to identify a geographical location of the user. Moreover, a closest content data network server may be identified based on that geographical location. During operation 512, a closest content data network server may be identified for the user.

Method 500 may proceed to operation 514 during which a content data object may be identified. As discussed above, a content data object may be a data object that is included in a user interface presented to a user. During operation 514 content data objects may be identified based, at least in part, on the segment data object. Accordingly, content data objects may be identified for the user, thus enabling the subsequent utilization of personalized content for the user.

Method 500 may proceed to operation 516 during which a local storage location may be updated. Accordingly, the segment data object may be sent to the content data network server for the user, and a local storage location, such as a content data network datastore, may be updated for the user. In this way, a local storage location of the content data network may be updated with the user's audience segment information. In various embodiments, during operation 516, the local storage location may also be updated to include the identified content data objects. Accordingly, the local storage locations may be pre-primed to store the identified content data objects so that they may be accessed and served with reduced latency when requested by the user.

Figure 6:
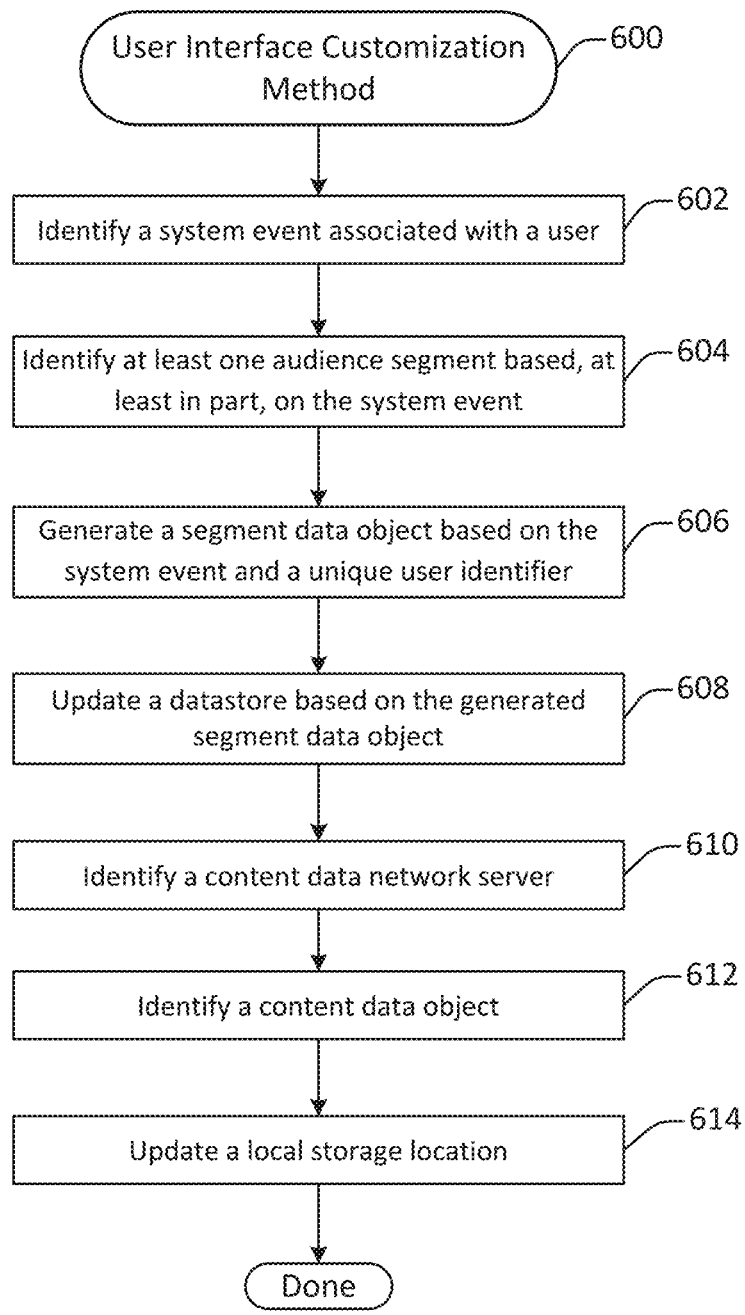
FIG. 6 illustrates a flow chart of another example of a method for user interface customization using a content data network, implemented in accordance with some embodiments.

FIG. 6 illustrates a flow chart of another example of a method for user interface customization using a content data network, implemented in accordance with some embodiments. As discussed above, a local storage location may be updated to store content that may be used to personalize and customize a user interface presented to a user. As will be discussed in greater detail below, a method, such as method 600, may be implemented to utilize additional types of events to pre-prime storage locations of a content data network. In this way, various different types of events associated with a user, or other entities such as system components, may be used to pre-prime storage locations of a content data network.

Method 600 may commence with operation 602 during which a system event is identified. In various embodiments, a system event may be an event that occurs within the context of a computing platform used to implement one or more applications. For example, a system event may be a type of event such as the sending or receiving of a text message, an email message, or a push notification. Accordingly, such system events may be other events, such as the sending or receiving of such messages and notifications, that may involve a user by, for example, mentioning the user or being directed to the user. In some embodiments, a system event may be a message or detected event generated by a system component, a client device, or a component of an application implemented on either one. For example, a smart device, such as a smart television may be configured to implement one or more streaming media applications. Accordingly, user actions, such as watching a particular show, may be logged by the streaming media application, and the smart television may generate and send a message that may be received and identified as a system event. Accordingly, the generation of one of these messages or notifications may be identified as a system event, and may be used to identify at least one user underlying the system event.

Method 600 may proceed to operation 604 during which an audience segment may be identified. As similarly discussed above, an audience segment may refer to one or more categories used to define a group of users. In various embodiments, during operation 604, an audience segment may be identified based, at least in part, on the user identifier identified during operation 602. Furthermore, it may be determined if the user is associated with one or more applications implemented on a computing platform.

Method 600 may proceed to operation 606 during which a segment data object may be generated. As also discussed above, if it is determined that the user belongs to one or more audience segments, a segment data object may be generated that includes the user identifier as well as audience segment identifiers that identify which audience segments the user belongs to. In some embodiments, if no audience segment exists, one may be generated based on available user characteristics, such as dimensions of the available user data.

Method 600 may proceed to operation 608 during which a datastore may be updated. In various embodiments, the user data included in the datastore may be updated to include the system event identified or generated during operation 602. Accordingly, the system event and any associated metadata may be received and stored in a data table of the datastore with the rest of the user data for that particular user.

Method 600 may proceed to operation 610 during which a content data network server may be identified. As discussed above, a content data network server may be identified based on metadata associated with a user, as well as one or more properties or characteristics of available content data network servers. For example, the metadata may include an IP address of the user, and the IP address may be used to identify a geographical location of the user. Moreover, a closest content data network server may be identified based on that geographical location. During operation 610, a closest content data network server may be identified for the user.

Method 600 may proceed to operation 612 during which a content data object may be identified. As discussed above, a content data object may be a data object that is included in a user interface presented to a user. During operation 612 content data objects may be identified based, at least in part, on the segment data object. Accordingly, content data objects may be identified for the user, thus enabling the subsequent utilization of personalized content for the user.

Method 600 may proceed to operation 614 during which a local storage location may be updated. Accordingly, the segment data object may be sent to the content data network server for the user, and a local storage location, such as a content data network datastore, may be updated for the user. In this way, a local storage location of the content data network may be updated with the user's audience segment information. In various embodiments, during operation 614, the local storage location may also be updated to include the identified content data objects. Accordingly, the local storage locations may be pre-primed to store the identified content data objects so that they may be accessed and served with reduced latency when requested by the user.

Figure 7:
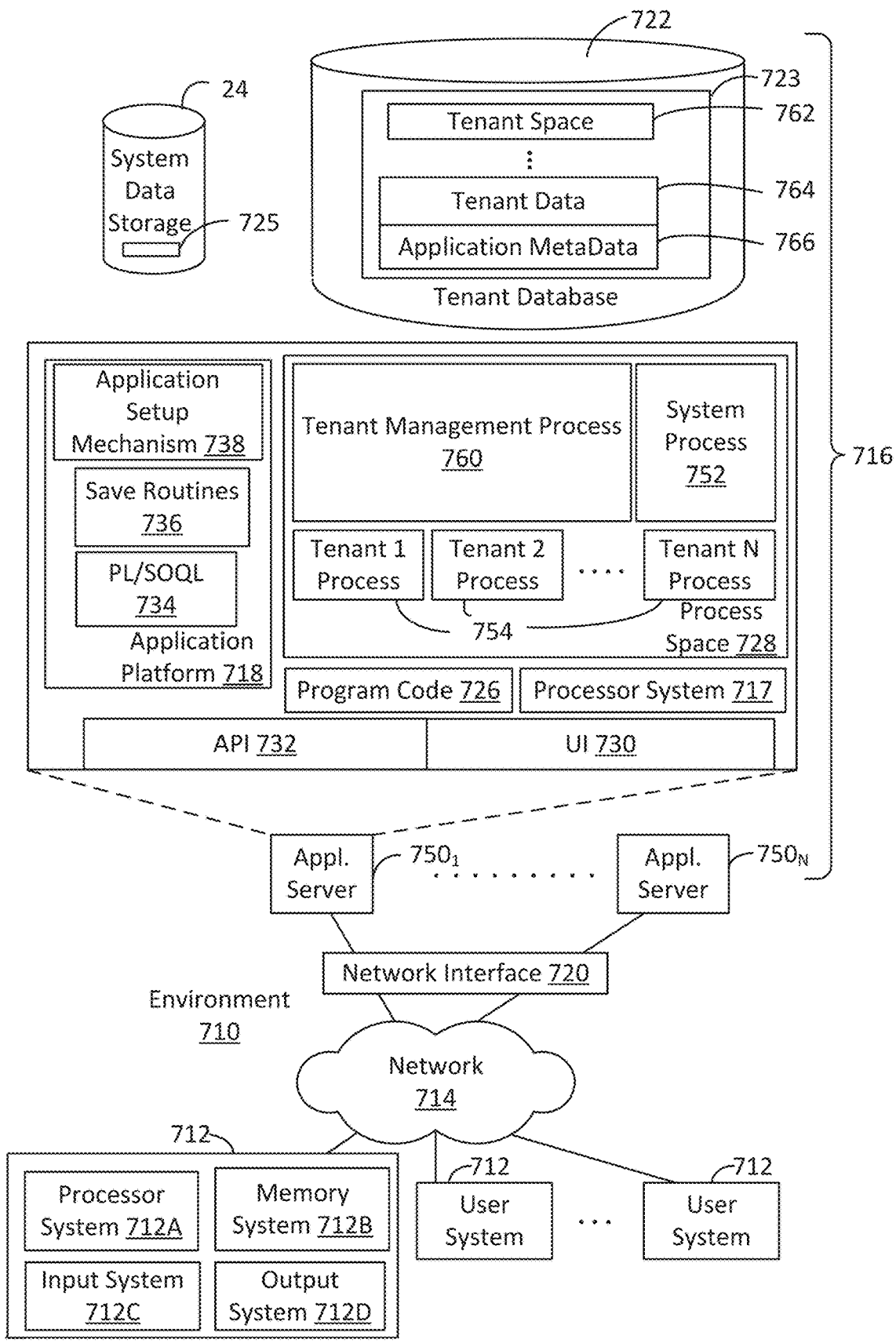
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based computing platform and content data network. For example, in some implementations, system 716 may include application servers configured to implement and execute user data storage and segment data object generation operations associated with SaaS software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a marketing platform, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. Database systems may also store data associated with individuals and entities that are associated a webpage personalization platform. Such data may include identifiers, metadata, as well as data event information. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
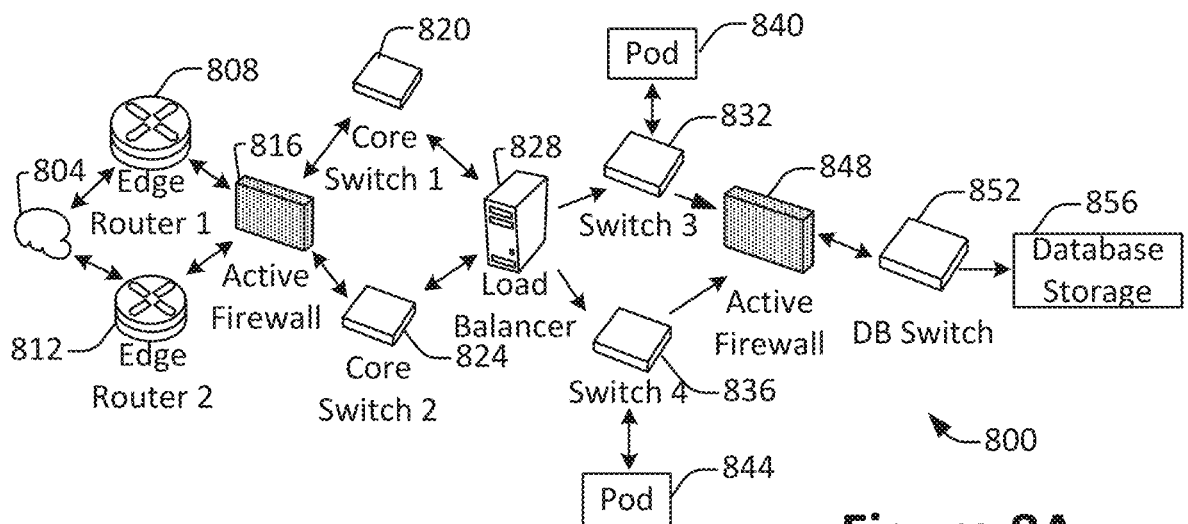
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process application data associated with SaaS applications.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
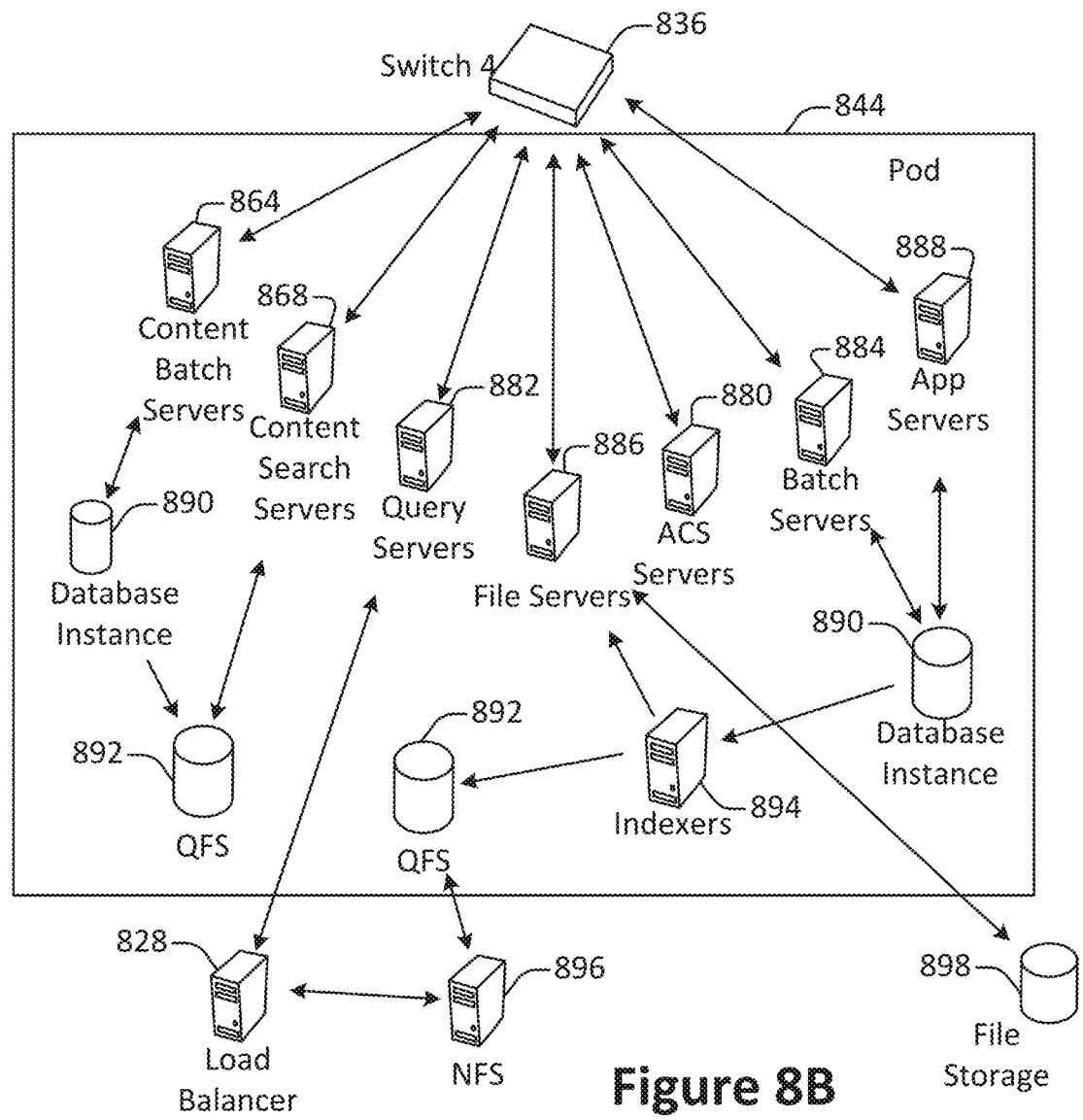
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
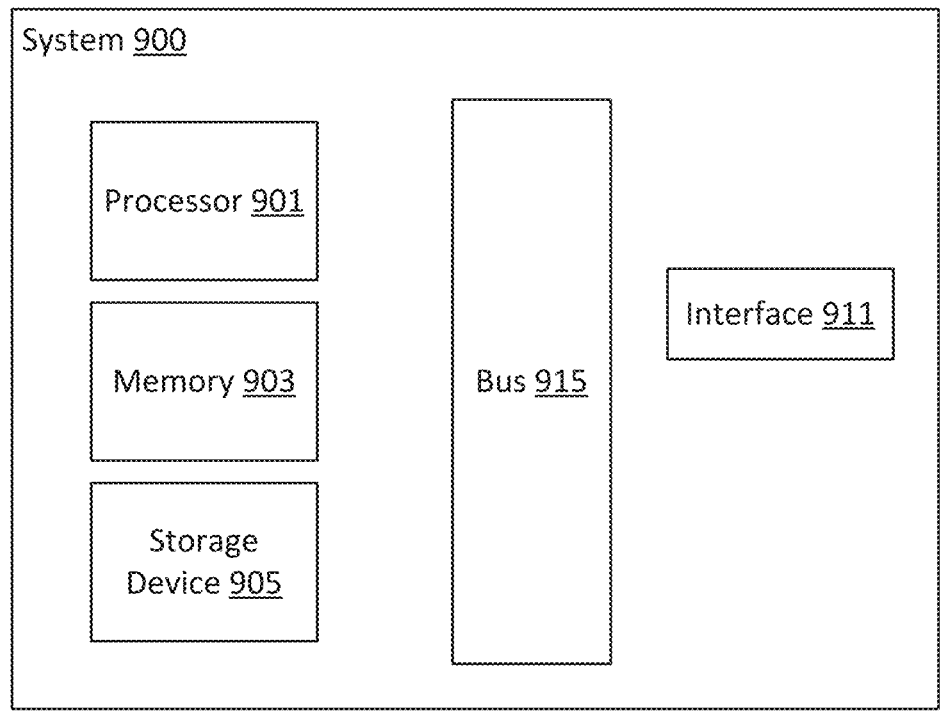
FIG. 9 illustrates one example of a computing device.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A computing platform implemented using a server system, the computing platform being configurable to cause:
    identifying a data event associated with a user based on an interaction between the user and a first user interface at a first geographical location, the data event comprising a unique user identifier, and the first user interface being provided by an application hosted by an on-demand computing platform;
    generating a segment data object based on the data event, the unique user identifier, and a segment database, the segment data object characterizing a membership of the user within an audience segment;
    identifying a content data network server based on a second geographical location of the user, the content data network server being included in geographically distributed network of data centers configured to store data for the computing platform, the first and second geographical locations being different geographical locations, the content data network server being a closest available content data network server to the user at the second geographical location, and the content data network server being capable of serving, to the user, one or more data objects associated with metadata customized based on one or more segment data objects;
    updating a local storage location of the content data network server at the second geographical location, the updating comprising storing the segment data object in the local storage location;
    retrieving, using the content data network server, one or more content data objects associated with the data event, the retrieving being responsive to the content data network server receiving the segment data object from the first geographical location, the one or more content data objects being identified by the content data network server based on the segment data object, and the one or more content data objects including a user interface element and associated session data identifying a status of the user and the user interface element at the end of a session in the first geographical location;
    storing the one or more content data objects, the user interface element, and the session data at the content data network server at the second geographical location;
    receiving, via the application, a request for a second user interface from the user in the second geographical location; and
    generating a customized user interface for the user based, at least in part, on the retrieved one or more content data objects and the segment data object, the customized user interface being configured to display a webpage customized based on the stored user interface element and based on the stored session data, and the customized user interface including metadata that is customized based, at least in part, on the segment data object to identify the membership of the user within the audience segment.

2. The computing platform of claim 1, wherein the content data network is configured to provide a network of local caches for a plurality of users.

3. The computing platform of claim 2, wherein the local storage location is a local cache associated with a user account of the user.

4. The computing platform of claim 1, wherein the content data network server is identified based on a geographical identifier associated with the user and a server identifier associated with the content data network.

5. The computing platform of claim 1, wherein the data event is a previously stored impression.

6. The computing platform of claim 1, wherein the data event is selected from a group consisting of: emails, text messages, and push notifications.

7. The computing platform of claim 1, wherein additional segment data objects are identified based, at least in part, on the stored segment data object.

8. The computing platform of claim 1, wherein additional storage locations are updated based, at least in part, on the stored segment data object.

9. The computing platform of claim 8, wherein the additional storage locations are associated with additional user accounts of additional users.

10. A method comprising:
    identifying a data event associated with a user based on an interaction between the user and a first user interface at a first geographical location, the data event comprising a unique user identifier, and the first user interface being provided by an application hosted by an on-demand computing platform;
    generating a segment data object based on the data event, the unique user identifier, and a segment database, the segment data object characterizing a membership of the user within an audience segment;
    identifying a content data network server based on a second geographical location of the user, the content data network server being included in geographically distributed network of data centers configured to store data for the computing platform, the first and second geographical locations being different geographical locations, the content data network server being a closest available content data network server to the user at the second geographical location, and the content data network server being capable of serving, to the user, one or more data objects associated with metadata customized based on one or more segment data objects;

updating a local storage location of the content data network server at the second geographical location, the updating comprising storing the segment data object in the local storage location;

retrieving, using the content data network server, one or more content data objects associated with the data event, the retrieving being responsive to the content data network server receiving the segment data object from the first geographical location, the one or more content data objects being identified by the content data network server based on the segment data object, and the one or more content data objects including a user interface element and associated session data identifying a status of the user and the user interface element at the end of a session in the first geographical location;

storing the one or more content data objects, the user interface element, and the session data at the content data network server at the second geographical location;

receiving, via the application, a request for a second user interface from the user in the second geographical location; and generating a customized user interface for the user based, at least in part, on the retrieved one or more content data objects and the segment data object, the customized user interface being configured to display a webpage customized based on the stored user interface element and based on the stored session data, and the customized user interface including metadata that is customized based, at least in part, on the segment data object to identify the membership of the user within the audience segment.

11. The method of claim 10, wherein the content data network provides a network of local caches for a plurality of users.

12. The method of claim 11, wherein the local storage location is a local cache associated with a user account of the user.

13. The method of claim 10, wherein the content data network server is identified based on a geographical identifier associated with the user and a server identifier associated with the content data network.

14. The method of claim 10, wherein the data event is a previously stored impression.

15. The method of claim 10 further comprising:
identifying additional segment data objects based, at least in part, on the stored segment data object.

16. The method of claim 10 further comprising:
updating additional storage locations based, at least in part, on the stored segment data object.

17. The method of claim 16, wherein the additional storage locations are associated with additional user accounts of additional users.

18. A computer program product comprising non-transitory computer-readable program code capable of being executed by one or more processors when retrieved from a non-transitory computer-readable medium, the program code comprising instructions configurable to cause the one or more processors to perform a method comprising:

identifying a data event associated with a user based on an interaction between the user and a first user interface at a first geographical location, the data event comprising a unique user identifier, and the first user interface being provided by an application hosted by an on-demand computing platform;

generating a segment data object based on the data event, the unique user identifier, and a segment database, the segment data object characterizing a membership of the user within an audience segment;

identifying a content data network server based on a second geographical location of the user, the content data network server being included in geographically distributed network of data centers configured to store data for the computing platform, the first and second geographical locations being different geographical locations, the content data network server being a closest available content data network server to the user at the second geographical location, and the content data network server being capable of serving, to the user, one or more data objects associated with metadata customized based on one or more segment data objects;

updating a local storage location of the content data network server at the second geographical location, the updating comprising storing the segment data object in the local storage location;

retrieving, using the content data network server, one or more content data objects associated with the data event, the retrieving being responsive to the content data network server receiving the segment data object from the first geographical location, the one or more content data objects being identified by the content data network server based on the segment data object, and the one or more content data objects including a user interface element and associated session data identifying a status of the user and the user interface element at the end of a session in the first geographical location;

storing the one or more content data objects, the user interface element, and the session data at the content data network server at the second geographical location;

receiving, via the application, a request for a second user interface from the user in the second geographical location; and generating a customized user interface for the user based, at least in part, on the retrieved one or more content data objects and the segment data object, the customized user interface being configured to display a webpage customized based on the stored user interface element and based on the stored session data, and the customized user interface including metadata that is customized based, at least in part, on the segment data object to identify the membership of the user within the audience segment.

19. The computer program product recited in claim 18, wherein the content data network provides a network of local caches for a plurality of users.

20. The computer program product recited in claim 18, wherein the content data network server is identified based on a geographical identifier associated with the user and a server identifier associated with the content data network.

* * * * *